Feb. 11, 1930. J. L. EMIG Re. 17,587

AWNING

Original Filed March 1, 1927 2 Sheets-Sheet 1

WITNESSES:

Alfred E. Schinger.

Wesley P. Merrill

INVENTOR:

John L. Emig,

BY

Joshua R. H. Potts

ATTORNEY

Feb. 11, 1930. J. L. EMIG Re. 17,587

AWNING

Original Filed March 1, 1927 2 Sheets-Sheet 2

WITNESSES:

Alfred E. Schinger.

Wesley Merrill

INVENTOR:

John L. Emig,

BY

Joshua R. H. Pope

ATTORNEY

Reissued Feb. 11, 1930

Re. 17,587

UNITED STATES PATENT OFFICE

JOHN L. EMIG, OF PHILADELPHIA, PENNSYLVANIA

AWNING

Original No. 1,652,566, dated December 13, 1927, Serial No. 171,852, filed March 1, 1927. Application for reissue filed December 9, 1929. Serial No. 412,947.

My invention relates to awnings and more particularly to means for mechanically raising and lowering same. The majority of large awnings are erected outside of places of business and it is oftentimes inconvenient to raise or lower the awning at the proper time, due to customers in the place of business or to suddenly inclement weather.

The principal object of my invention is to provide means whereby such awnings may be raised or lowered without any inconvenience and without leaving the interior of the building.

Figure 1:
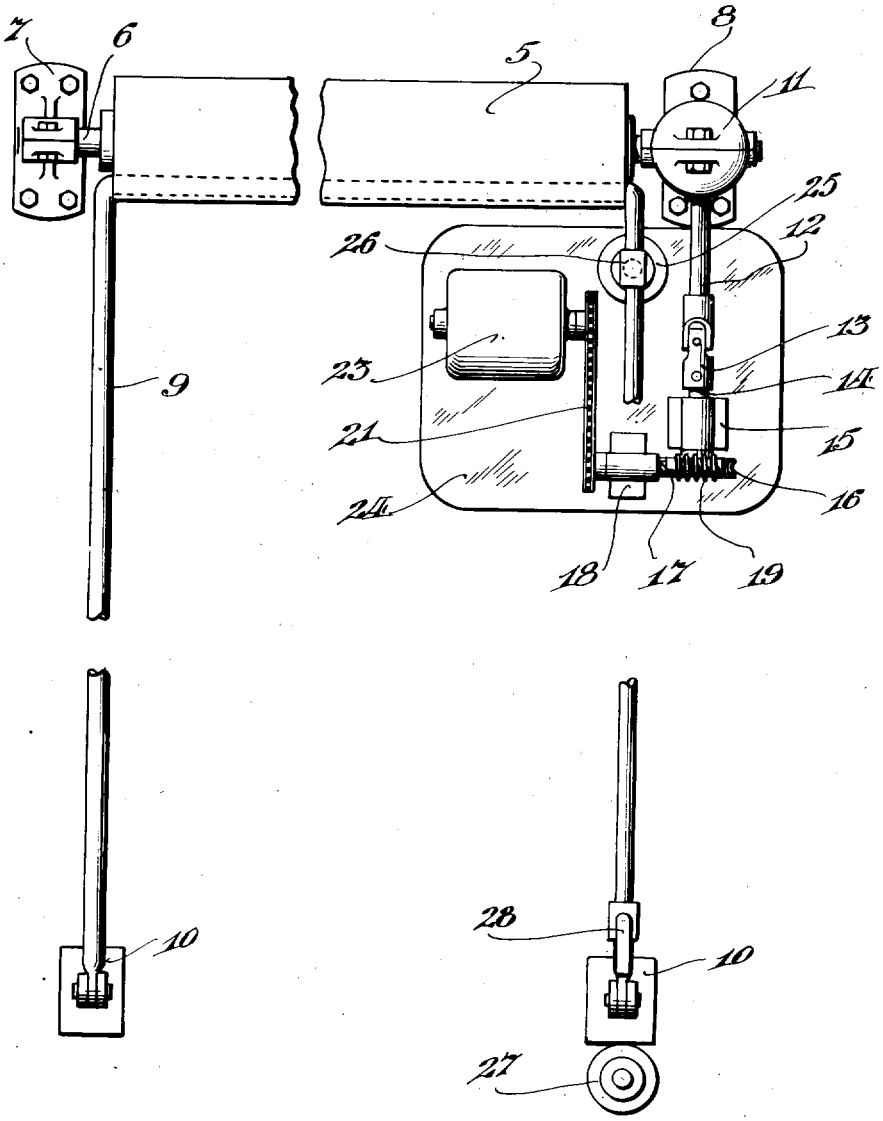

This object, and other advantageous ends which will be described hereinafter, I attain in the following manner, reference being had to the accompanying drawings in which Figure 1 is a front elevation of an awning to which an embodiment of my invention has been applied, certain parts being broken away, Figure 2 an end view of the operating mechanism shown in Figure 1, looking from the right, and Figure 3 a diagram showing a method of wiring the switches and motor.

Figure 2:
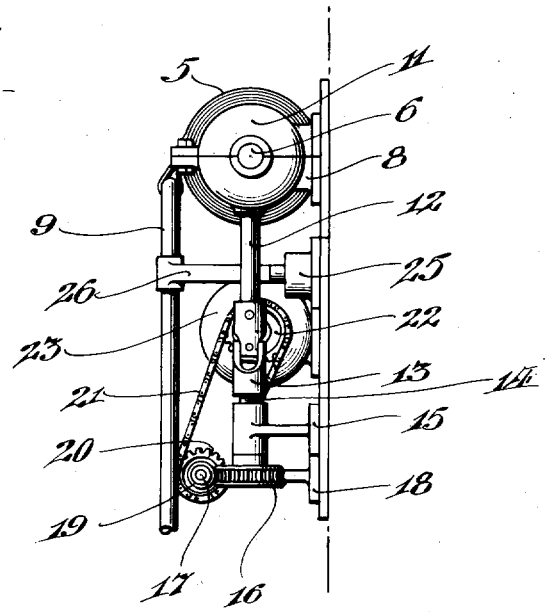

Referring more particularly to Figures 1 and 2, the awning cover 5 is shown rolled on a roller shaft 6, journaled in bearings 7 and 8, and having a movable U-shaped frame 9 fastened in one edge of awning 5 and hinged in bearings 10. A gear box 11 is mounted on bearing 8 and mechanically connected to shaft 6. A vertical shaft 12 is mechanically connected in gear box 11 and provided with a universal joint 13 at its lower end which is ordinarily connected to a hand operating device of some suitable design. The parts thus far described are standard awning parts and form no part of my invention, but have been illustrated and described in order that the operation of my invention may be thoroughly understood.

The embodiment of my invention illustrated is intended to be installed on existing awning structures and this is accomplished by removing the usual shaft from the lower part of universal joint 13 and substituting a stub shaft 14 which is journaled in a bearing 15 and has a worm wheel 16 fixed to its lower end. A worm shaft 17 is journaled in a bearing 18 and has a worm 19 fixed to one of its ends and meshing with worm wheel 16 and a sprocket 20 fixed on its other end. A sprocket chain 21 connects sprocket 20 to a sprocket 22 fixed on the armature shaft of an electric motor 23.

Bearings 7, 8 and 10 are usually mounted on the frame of a window or on the face of a building and bearings 15 and 18 and motor 23 are preferably mounted on a support 24, which may be a rectangular board secured to the window frame or face of the building. Where a complete awning structure is furnished, worm wheel 16 may be mounted directly on shaft 6; worm 19 mounted on an extension of the armature shaft of motor 23; motor 23 turned at right angles to the position shown in the drawing, and a wedge shaped base inserted between the motor and the window frame so that worm 19 will overlap and mesh with worm wheel 16.

A limit switch 25, which is spring pressed to hold it normally in a closed position, is mounted on support 24 immediately behind the near side of frame 9. A plunger switch opener 26 is suitably secured to this side of frame 9 in such a position that its free end will engage switch 25 and open same when the awning is approximately in fully raised position. A limit switch 27, which may be identical with switch 25, is mounted directly below the same side of frame 9 and is adapted to be engaged by a plunger switch opener 28 secured to frame 9 and bent to make contact with the switch just before the frame 9 reaches its lowermost position.

Figure 3:
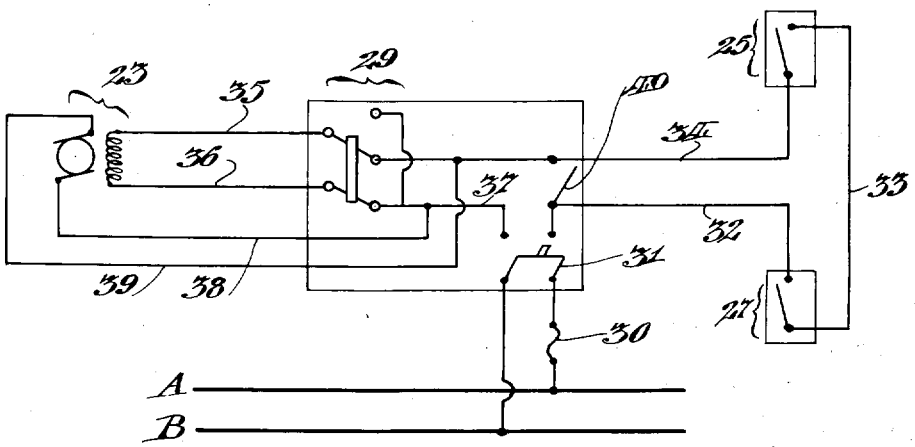

Referring now to Figure 3, the direction of rotation of motor 23 is controlled by a pole-changing switch 29. Power is supplied to motor 23 from power line A, through fuse 30, switch 31, wire 32, switch 27, wire 33, switch 25, wire 34, switch 29, wire 35, through the field of motor 23, wire 36, switch 29, wire 37, switch 31 to power line B. One brush of motor 23 is connected through wire 38 to wire 37 and the other brush of motor 33 is connected through wire 39 to wire 34. It is thus evident that, with switches 25, 27 and 31 closed, power will flow through the above circuit to both the armature and field of motor 23 and that the direction of rotation of the motor may be changed by manipulating switch 29. It is also understood that instead of reversing the field, as shown diagrammatically in Figure 3, the armature may be reversed.

Assuming that the switch 29 is set to cause motor 23 to lower the awning, closing switch 31 will cause frame 9 to descend and plunger 28 engage switch 27 and break the circuit at this point. In this condition, it would be impossible to raise the awning were it not for a normally open spring pressed switch 40 having one pole connected to wire 32 and its other pole connected to wire 34 and located in any convenient position but preferably alongside switch 29. It is evident that closing switch 40 will connect motor 23 to power line A—B. It is only necessary to turn switch 29 for the desired direction of movement and press switch 40 momentarily, which will cause motor 23 to rotate and move frame 9 away from the limit switch which is being held open. The limit switch will immediately close and reestablish the original circuit.

Thus, the switch openers 26 and 28 are actuated by the motor through the gearing, awning covering and frame; and the limit switches 25 and 26 which are connected in the electric circuit in series with the motor, are disposed in the path of, and adapted to be opened by the switch openers, for controlling the rotation of the motor for limiting the travel of the frame. Moreover, the switch 29 which controls the direction of rotation of the motor is connected in the electric circuit in series with the limit switches and motor while the starting switch 40 is connected in the circuit in series with the direction controlling switch 29 and the motor, and in parallel with the limit switches 25 and 27.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:

1. In an awning having a swingably mounted frame and a roller for receiving the awning covering, means for raising and lowering the awning including an electric circuit, a motor connected in the circuit, gearing connecting the roller to the motor, switch openers fixed on the frame, limit switches disposed in the path of, and adapted to be opened by, the switch openers for limiting the travel of the frame, and a switch for controlling the direction of rotation of the motor.

2. In an awning having a swingably mounted frame and a roller for receiving the awning covering, means for raising and lowering the awning including an electric circuit, a motor connected in the circuit, gearing connecting the roller to the motor, switch openers fixed on the frame, limit switches disposed in the path of, and adapted to be opened by, the switch openers for limiting the travel of the frame, a switch for controlling the direction of rotation of the motor, and a switch for energizing the motor when one of the limit switches is open.

3. In an awning having a swingably mounted frame, and a roller for receiving the awning covering, means for raising and lowering the awning including an electric circuit, a motor connected in the circuit, a worm wheel connected to the roller, a worm connected to the motor and meshing with the worm wheel, limit switches in the circuit and disposed in the path of the frame, plungers on the frame adapted to open the limit switches for limiting the travel of the frame, and a switch for controlling the direction of rotation of the motor.

4. In an awning having a swingably mounted frame, and a roller for receiving the awning covering, means for raising and lowering the awning including an electric circuit, a motor connected in the circuit, a worm wheel connected to the roller, a worm connected to the motor and meshing with the worm wheel, limit switches in the circuit for limiting the travel of the frame, a switch for controlling the direction of rotation of the motor, and a switch for energizing the motor when one of the limit switches is open.

5. In an awning having a frame and gearing adapted to raise and lower the awning, means for actuating the gearing to raise and lower the awning within fixed limits including an electric motor having a shaft, a sprocket fixed on the motor shaft, a bearing, a worm shaft rotatable therein, a sprocket on one end of the worm shaft, a chain connecting the sprockets, a worm on the other end of the worm shaft, a worm wheel meshing with the worm and connected to the gearing, means for supplying power to the motor, limit switches electrically connected with the motor and disposed in the path of the frame, plungers on the frame adapted to open the limit switches for limiting the travel of the awning, and a switch for energizing the motor when one of the limit switches is open.

6. In an awning having a movably mounted frame and a roller for receiving the awning cover, means for raising and lowering the awning including an electric circuit, a motor connected in the circuit, gearing connecting the roller to the motor, switch openers actuated by the motor, limit switches for the motor connected in the circuit in series with the motor disposed in the path of, and adapted to be opened by the switch openers for limiting the travel of the frame, and a switch for controlling the direction of rotation of the motor connected in the circuit in series with the limit switches and motor.

7. In an awning, a movably mounted frame, a rotatable roller, an awning covering connected with the frame and roller and adapted to be rolled around the roller, means for rotating the roller for rolling the awning cover thereon and for moving the frame including an electric circuit, a motor connected in the circuit and gearing connecting the roller to the motor, limit switches for the motor in the circuit in series with the motor, means actuated by the motor for operating the limit switches for limiting the rotation of the roller and the travel of the frame, a switch for controlling the direction of rotation of the motor connected in the circuit in series with the limit switches and motor, and a switch for starting the motor in the circuit in series with the direction controlling switch and motor and in parallel with the limit switches.

In testimony whereof I do now affix my signature.

JOHN L. EMIG.